Aug. 4, 1953 P. C. GOLDMARK 2,647,753

PHONOGRAPH PICKUP MOUNTING

Filed Sept. 22, 1948 2 Sheets-Sheet 1

INVENTOR
PETER C. GOLDMARK
BY
Pennie, Edmonds, Morton and Barrows
ATTORNEYS

Aug. 4, 1953 P. C. GOLDMARK 2,647,753
PHONOGRAPH PICKUP MOUNTING
Filed Sept. 22, 1948 2 Sheets-Sheet 2
Fig. 3,
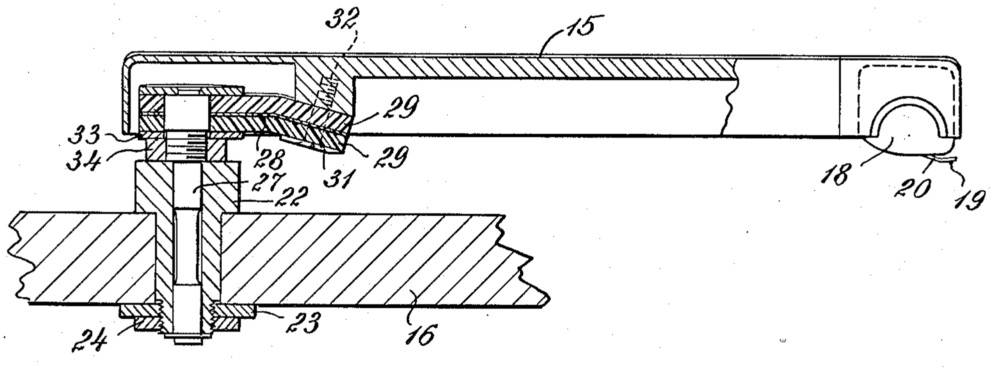
Fig. 5.
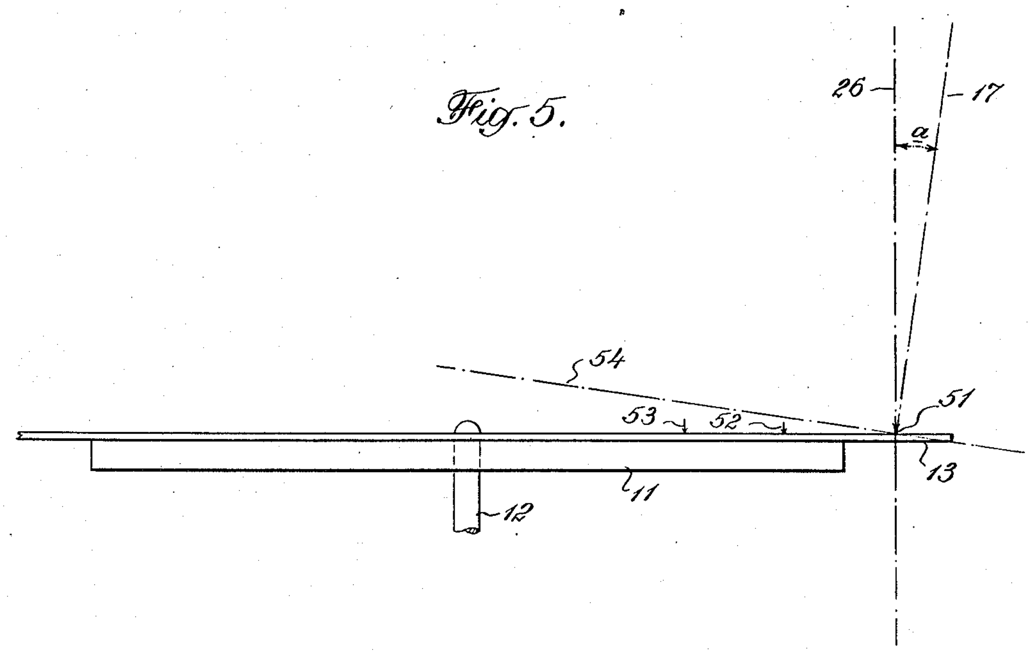
INVENTOR
PETER C. GOLDMARK
BY
Pennie, Edmonds, Morton and Barrows
ATTORNEYS Patented Aug. 4, 1953

2,647,753

UNITED STATES PATENT OFFICE 2,647,753

PHONOGRAPH PICKUP MOUNTING

Peter C. Goldmark, New Canaan, Conn., assignor to Columbia Broadcasting System, Inc., New York, N. Y., a corporation of New York Application September 22, 1948, Serial No. 50,614

8 Claims. (Cl. 274—23)

This invention relates to phonographs for playing sound records of the disk type, and particularly to the mounting of the reproducer arm to increase tracking stability.

Conventional phonographs for playing records of the disk type commonly have a rotatable turntable for receiving the record disks and a reproducer or pickup arm mounted alongside the turntable. The arm carries a stylus near one end which engages the record grooves and travels in an arc from outer to inner grooves during the reproduction of the record. Usually the turntable is horizontal and rotates about a vertical spindle. The mounting for the reproducer arm is commonly provided with a vertical bearing for allowing lateral rotation of the arm, and a horizontal bearing or other type of coupling for allowing vertical movement of the stylus. While the arm may be made of any desired length, in most equipment for home use it is made relatively short so as to provide as compact a playing unit as possible. The minimum length is of course determined by the maximum diameter of record which it is intended to play. Most records intended for home use are ten inches or twelve inches in diameter and pickup arms somewhat over six inches from vertical axis to stylus are employed.

Since the stylus moves in an arc about a fixed point alongside the turntable, when the stylus engages a sound groove spiral the friction of the stylus in the groove produces an inwardly-acting force which tends to move the stylus toward the center of the turntable. This has a tendency to cause the stylus to jump record grooves, so that the arm is ordinarily made sufficiently heavy to yield a stylus pressure which will prevent such jumping of grooves. Of course, a certain minimum stylus pressure is required properly to actuate the pickup device which translates movements of the stylus into audio electric signals. Most reproducer arms commonly used at the present time provide stylus pressures of the order of 30 grams (1 ounce) or more to provide proper actuation of the pickup cartridge and sufficient tracking stability. Pickup arms have been available which employ somewhat lower stylus pressures, down to about 15 grams. The forces acting on the stylus are more complicated than described above, and certain aspects will be discussed somewhat more in detail hereinafter.

It has heretofore been proposed to make sound records disks with much finer grooves than are commonly employed. In my copending applications, Serial Nos. 19,922, now abandoned, and 19,925, filed April 9, 1948, I have described fine groove records in which the spiral sound groove has more than 200 convolutions per inch and rotates at 33⅓ R. P. M. Such records provide several times the available playing time of conventional records of the same diameter. In order to play such records without excessive wear it is highly desirable to employ very low stylus pressures, preferably not exceeding 8 grams. It is found that with such low stylus pressures there is often a strong tendency for the stylus to jump grooves. This seriously affects the practicability of using fine groove records.

In accordance with the present invention, it is found that by tilting the normally vertical axis of rotation of the pickup arm a few degrees outwards in a direction lateral of the arm during play, tracking stability may be markedly improved and the danger of jumping grooves greatly reduced. It is found that tracking instability is most serious in the outer grooves of the record, and accordingly the normally vertical axis of rotation is advantageously tilted outwardly in a direction lateral of the arm in the position thereof for engaging sound record grooves of the maximum diameter it is intended to play.

The invention will be more fully understood by reference to the following description of a specific embodiment thereof, taken in conjunction with the drawings in which:

Fig. 3 is a side view of the arm, partly in section;

Fig. 5 is a diagram further illustrating the angle of tilt.

Figure 1:
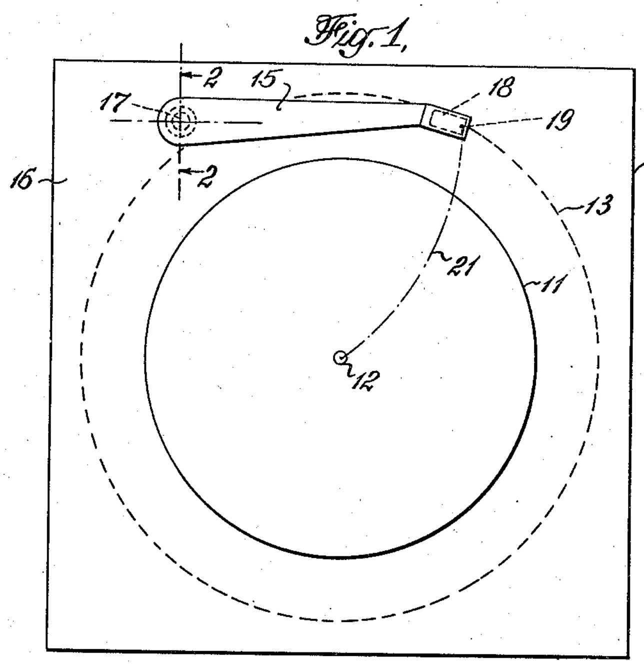
Fig. 1 is a plan view of a turntable and reproducer arm in accordance with the invention.

Referring now to Fig. 1, a box 10 has a turntable 11 mounted therein for rotation about spindle 12. The turntable may be of any desired diameter and driven in any desired manner. As shown, the dotted circle 13 represents a 12-inch record on the turntable, and the turntable is somewhat smaller in diameter.

The reproducer or pickup arm 15 is shown mounted on a base plate 16 in box 10, for rotation about axis 17. Axis 17 may be termed generally the "vertical" axis of rotation, but as will be explained hereinafter it is actually tilted at a small angle to the vertical. The axis of rotation 17 allows the arm to rotate laterally in reproducing a record. At the end of arm 15 remote from the axis of rotation 17 is a pickup cartridge 18 having a stylus suspension for holding stylus 19 in playing position. As shown in Fig. 3, the stylus suspension includes a cantilever 20 which provides lateral and vertical compliance. In order to decrease the mass and moment of inertia of the stylus and stylus suspension, the stylus will ordinarily be permanently attached to the pickup cartridge 18. However, a removable stylus could be employed if desired.

As shown, the arm 15 is of the type described in my copending application Serial No. 30,024, filed May 29, 1948, and is provided with a coupling allowing vertical movement of the stylus to facilitate placing the stylus on a record and to allow sufficient vertical movement to follow warped records, etc. Of course, any other desired type of pickup arm may be employed and, in particular, the coupling allowing vertical movement may be a generally horizontally-disposed pivot-type bearing.

As the stylus travels inwardly in reproducing a record, the stylus 19 travels along arc 21. In order to minimize the tracking error, the axis of the pickup cartridge 18 may be placed at a small angle to the remainder of arm 15, and the location of the axis 17 may be such as to allow the stylus to travel in an arc which is slightly beyond the spindle 12 at the central position. These factors are well known in the art and need not be described further.

Figure 2:
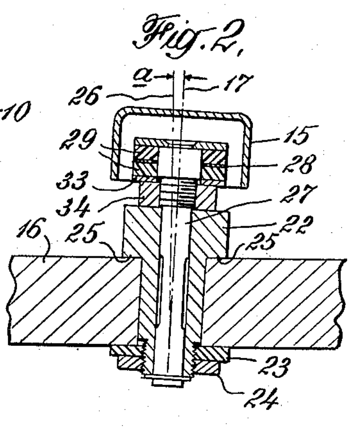
Fig. 2 is a cross-sectional detail taken along the line 2—2 of Fig. 1 showing the angle of tilt of the normally vertical bearing.

Referring now to Fig. 2, the support mounting for arm 15 includes a bearing 22 secured in base plate 16 by means of a wedge-shaped washer 23 and nut 24. The surface 25 of the bearing is formed at a slight angle to the bearing axis 17 so that, together with the wedge-shaped washer 23, the axis 17 is at a small angle $a$ to the vertical line 26. The purpose and direction of this angle will be discussed hereinafter in connection with Figs. 4 and 5.

As shown in Fig. 3, arm 15 is secured to the top of the bearing spindle 27 by means of a flat metallic leaf spring 28 and associated sheets 29 of a pliable damping material such as the pliable cellulose-nitrate plastic sold under the trade-name "Pyralin" and sometimes referred to as "Pyralin vibration damping stock." The spring 28 allows vertical movement of the stylus and also may be flexed as illustrated to supply an upward force to decrease the stylus pressure. The pliable sheets 29 provide mechanical resistance which damps resonant oscillations in the arm. The composite sandwich composed of spring 28 and damping layers 29 is secured to the arm by means of clamping plate 31 and screws 32. The sandwich is secured to the top of spindle 27 by means of a clamping plate 33 and nut 34. This construction has been described fully in my copending application referred to above and hence need not be explained further.

Figure 4:
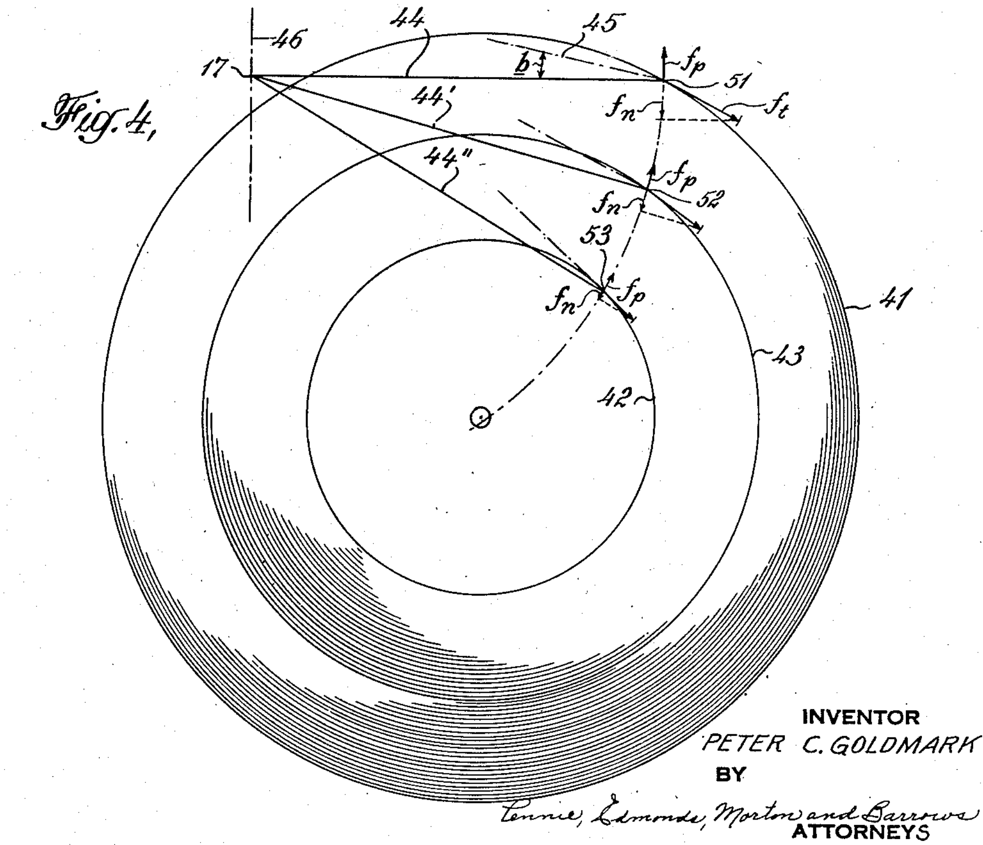
Fig. 4 is a diagram illustrating certain forces acting on the reproducer arm.

Referring now to Fig. 4, 41 represents the maximum diameter sound groove which it is desired to reproduce, 42 represents the minimum diameter sound groove and 43 represents a median sound groove. Lines 44, 44' and 44'' represent different positions of the pickup arm 15, the lines being drawn from the axis of rotation 17 to points 51, 52, 53 representing the position of stylus 19 at the respective sound grooves. Angle $b$ represents the offset angle of the pickup cartridge 18 which minimizes tracking error in accordance with principles well known in the art. In the specific example illustrated, it is of the order of 15 degrees. At some median sound groove the axis 45 of the pickup cartridge 18 will be tangent to the groove, but it will depart from tangency at outermost and innermost grooves.

During the reproduction of a record, friction is produced between the stylus and the record groove. Assuming an unmodulated groove, the frictional force is tangent to the particular convolution of the spiral engaged by the stylus and is denoted $f_t$. Force $f_t$ has its maximum value at the outermost groove of the record, and diminishes in value towards the inner grooves of the record, approaching zero at the center of the record if the sound groove actually extended in that far (which it does not in practice). The force $f_t$ may be resolved into a component $f_n$ perpendicular to line 44 and a component parallel to line 44 (not shown). Force $f_n$, being lateral to the arm, is the component which tends to rotate the pickup arm 15 inwards toward the turntable spindle. If this force is excessive, with respect to other factors, the stylus will jump grooves. To prevent this, the record grooves are commonly made deep enough and the stylus pressure made high enough so that tracking is stable. However, with fine groove records and light stylus pressures, it is found that in many cases the tracking is not sufficiently stable to avoid jumping grooves with the conventional vertical axis of rotation.

It will be noted that force $f_n$ decreases in magnitude towards the inner grooves of the record so that the tendency to jump grooves is greatest in the outer zone. The decrease in force $f_n$ with radius is due to the fact that the force $f_t$ decreases due to the lower linear speed, and also due to the fact that the line 44 becomes more nearly tangent to the record groove.

Before discussing the effect of the tilt of the axis of rotation, it might be pointed out that as the stylus tracks inwardly in the spiral groove, the mass of the arm tends to resist the inward movement and hence in part tends to counteract the tendency to jump grooves inwards caused by groove friction. This counteracting force is fairly constant regardless of radius, if the pitch of the spiral is constant, but is small in magnitude and is not sufficient in many cases. There are also forces acting on the stylus and arm due to the lateral groove modulation. With laterally modulated grooves the force on the stylus alternates in direction. This creates forces tending to cause the stylus to jump out of the groove, the tendency depending upon the frequency and amplitude of the modulation, and upon the resonant frequency of the arm, among other factors. If the arm does not have sufficient tracking stability, conditions may arise from time to time under which it will jump grooves even though it may often track satisfactorily.

It has been found that tracking stability is markedly improved by providing an outward tilt of the axis of rotation as shown by angle $a$ in Fig. 2. Since the tracking instability is greatest for the outermost sound groove, it is advantageous to tilt the axis of rotation in a direction lateral of the arm in the position in which the arm engages the maximum diameter sound grooves for which the phonograph is designed. In Fig. 4, the axis of rotation 17 may be tilted outwards in plane 46 which is perpendicular to line 44 passing through the axis of rotation and the position of stylus 19 in which it engages the maximum diameter sound groove. The angle between plane 46 and line 44 may depart somewhat from perpendicularity with satisfactory results. For example, the position of line 44 representing the pickup arm may be somewhat outside the starting position on a record and the vertical axis tilted in the plane perpendicular to this position.

The angle of tilt is ordinarily only a few degrees. For playing fine groove records described above with a pickup arm providing a stylus pressure of about 6 grams, tilt angles not exceeding several degrees have been found satisfactory. As specific examples, angles of tilt of 1½ and 2 degrees have been employed with success. In one instance, with a 2-degree tilt, it was found that the stylus pressure could be reduced from 9 grams to 3 grams without impairing the tracking stability, and indeed some improvement in tracking stability appeared to result. The optimum angle of tilt depends upon factors such as length of arm, weight of arm, stylus pressure, record characteristics, etc. A satisfactory angle may be determined readily in a given case by a few simple tries. As an aid to determining the optimum angle, the stylus may be placed in position on a blank record disk and the angle selected to give minimum radial movement as the turntable rotates.

Fig. 5 illustrates the effect of the angle of tilt in a different manner. Here record 13 is shown on turntable 11 rotating about spindle 12. The starting position of the stylus on the outermost groove of the record is shown at 51, corresponding to that shown in Fig. 4. The intermediate position of the stylus is shown at 52, and the position in the innermost groove is shown at 53. Axis 17 is shown at the small angle $a$ with the vertical line 26, and line 54 represents a plane which is perpendicular to the axis of rotation 17. It will be noted that this plane 54 slopes upwardly and inwardly along the path of travel of the stylus in traveling from its outermost position 51 to its innermost position 53. Due to this slope, an outwardly acting force is produced which tends to counteract the inwardly acting force of friction on the stylus.

The invention has been described hereinbefore in connection with a specific embodiment thereof, and specific values have been given by way of example. It will be understood that many details may be varied to fit a given application, within the spirit and scope of the invention.

I claim:

1. In a phonograph having a horizontally-disposed turntable rotatable about a vertical axis for receiving sound records of the disk type, in combination, a reproducer arm, a support mounting for said arm having an axis of rotation allowing lateral rotation of the arm, and a stylus mounting on said arm at a position remote from said support mounting, said support mounting being positioned with respect to the turntable to allow the stylus mounting to move in an arc thereover for reproducing records, said axis of rotation being tilted outwardly at a small angle to the vertical with the plane perpendicular to said axis sloping upwardly and inwardly along the playing arc of travel of said stylus mounting so that the weight of the arm produces a component of force at said stylus mounting in the outer direction of said playing arc, whereby stable tracking without jumping grooves is improved.

2. In a phonograph having a horizontally-disposed turntable rotatable about a vertical axis for receiving sound records of the disk type, in combination, a reproducer arm, a support mounting for said arm having an axis of rotation allowing lateral rotation of the arm and a coupling allowing vertical movement thereof, and a stylus mounting on said arm at a position remote from said support mounting, said support mounting being positioned with respect to the turntable to allow the stylus mounting to move in an arc intersecting the approximate center of the turntable for reproducing records, said axis of rotation being tilted outwardly at a small angle to the vertical with the plane perpendicular to said axis sloping upwardly and inwardly along the playing arc of travel of said stylus mounting so that the weight of the arm produces a component of force at said stylus mounting in the outer direction of said playing arc, said small angle being predetermined to provide an outwardly-acting force at the stylus mounting which at least partially counteracts the inwardly-acting force due to engagement with a sound groove during reproduction, whereby stable tracking without jumping grooves is improved.

3. In a phonograph including a horizontally-disposed turntable for receiving disk records having predetermined maximum diameter sound grooves, in combination, a reproducer arm, a support mounting for said arm having an axis of rotation allowing lateral rotation of the arm, and a stylus mounting on said arm at a position remote from said support mounting, said axis of rotation being tilted at a small angle to the vertical in a direction laterally outwards and upwards of the arm in the position thereof for engaging said sound record grooves of predetermined maximum diameter so that the weight of the arm produces a component of force at said stylus mounting away from the turntable axis, whereby stable tracking without jumping grooves is improved.

4. In a phonograph having a horizontally-disposed turntable for receiving disk records having predetermined maximum diameter sound grooves, in combination, a reproducer arm having a stylus mounting near one end thereof, and a mounting for said arm having a bearing allowing lateral movement of said stylus mounting during reproduction of a disk record, said bearing being tilted outwardly and upwardly at a small angle to the vertical in a plane substantially at right angles to a line through the bearing and the position of the stylus for engaging a sound groove of said predetermined maximum diameter so that the weight of the arm produces a component of force at said stylus mounting away from the turntable axis.

5. In a phonograph having a horizontally-disposed turntable for receiving disk records having predetermined maximum diameter sound grooves, in combination, a reproducer arm having a stylus mounting near one end thereof, and a support mounting for said arm having a bearing allowing lateral movement and a coupling allowing vertical movement of the stylus mounting, said support mounting being positioned with respect to the turntable so as to allow the stylus mounting to move in an arc from the outermost groove of a record toward the center portion thereof, said bearing being tilted at a small angle to the vertical in a direction laterally outwards and upwards with respect to the arm in the position thereof for engaging sound record grooves of said predetermined maximum diameter so that the weight of the arm produces a component of force at said stylus mounting away from the turntable axis, whereby stable tracking without jumping grooves is improved.

6. In a phonograph having a horizontally-disposed turntable rotatable about a vertical axis for receiving disk records having predetermined maximum diameter sound grooves, in combination, a reproducer arm having a stylus mounting near one end thereof, and a support mounting for said arm, having a bearing allowing lateral movement and a coupling allowing vertical movement of the stylus mounting, said support mounting being positioned alongside said turntable to allow the stylus mounting to move in an arc intersecting the approximate center of the turntable for reproducing records, said bearing being tilted at a small angle to the vertical in a direction laterally outwards and upwards with respect to the arm in the position thereof for engaging sound record grooves of said predetermined maximum diameter so that the weight of the arm produces a component of force at said stylus mounting away from the turntable axis, said small angle being predetermined to provide an outwardly-acting force at the stylus mounting which at least partially counteracts the inwardly-acting force due to engagement with a sound groove during reproduction, whereby stable tracking without jumping grooves is improved.

7. In a phonograph for playing fine-groove disk records having predetermined maximum diameter sound grooves, the combination which comprises a horizontally-disposed turntable mounted for rotation about a vertical axis, a reproducer arm, a support mounting for said arm having a bearing allowing lateral rotation of said arm and a coupling allowing vertical movement thereof, a stylus mounting near the end of said arm remote from said support mounting, said support mounting being positioned alongside said turntable to allow the stylus mounting to move in an arc from the outside of said turntable toward the approximate center thereof during reproduction of a record, said bearing being tilted outwardly and upwardly at a small angle to the vertical not exceeding several degrees in a plane substantially perpendicular to a horizontal line intersecting said bearing and the position of the stylus for engaging a sound record groove of said predetermined maximum diameter so that the weight of the arm produces a component of force at said stylus mounting away from the turntable axis, said small angle being predetermined to provide an outwardly-acting force at the stylus mounting which at least partially counteracts the inwardly-acting force due to engagement with a sound groove during reproduction, whereby stable tracking without jumping grooves is improved.

8. In a phonograph for playing fine-groove disk records having sound groove spirals of more than 200 convolutions per inch and of predetermined maximum diameter, the combination which comprises a horizontally-disposed turntable mounted for rotation about a vertical axis, a light-weight reproducer arm having a stylus mounted near one end thereof and providing a stylus pressure on a record not exceeding about eight grams, and a support near the other end of said arm having a bearing allowing lateral rotation of the arm and a coupling allowing vertical movement of said stylus, said support being mounted alongside said turntable to allow the stylus to move in an arc from the outside of said turntable toward the approximate center thereof, said bearing being tilted outwardly and upwardly at a small angle to the vertical in a plane substantially perpendicular to a horizontal line intersecting said bearing and the position of the stylus for engaging a sound record groove of said predetermined maximum diameter so that the weight of the arm produces a component of force at said stylus mounting away from the turntable axis, said angle not exceeding several degrees and being sufficient to provide an outward lateral force at the stylus to at least partially counteract the inward lateral force due to engagement of the stylus with a record groove during reproduction, whereby stable tracking without jumping grooves is enhanced.

PETER C. GOLDMARK.

References Cited in the file of this patent

UNITED STATES PATENTS

| Number | Name | Date |
|---|---|---|
| 703,764 | Chapman | July 1, 1902 |
| 919,856 | Haile | Apr. 27, 1909 |
| 1,304,404 | Swing | May 20, 1919 |
| 1,383,372 | Baum | July 5, 1921 |
| 1,696,872 | Weil | Dec. 25, 1928 |
| 2,323,066 | May | June 29, 1943 |

FOREIGN PATENTS

| Number | Country | Date |
|---|---|---|
| 116,163 | Great Britain | June 6, 1918 |